United States Patent
Tischart et al.

(10) Patent No.: US 10,469,496 B2
(45) Date of Patent: *Nov. 5, 2019

(54) FABRIC ASSISTED IDENTITY AND AUTHENTICATION

(71) Applicant: McAfee, LLC, Santa Clara, CA (US)

(72) Inventors: James Tischart, Parker, CO (US); Jonathan Anderson, Alpharetta, GA (US)

(73) Assignee: MCAFEE, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,799

(22) Filed: May 2, 2019

(65) Prior Publication Data

US 2019/0260744 A1  Aug. 22, 2019

Related U.S. Application Data

(63) Continuation of application No. 15/392,454, filed on Dec. 28, 2016, now Pat. No. 10,313,343.

(51) Int. Cl.
*H04L 29/06* (2006.01)
*H04W 12/06* (2009.01)

(52) U.S. Cl.
CPC ...... *H04L 63/0876* (2013.01); *H04L 63/0272* (2013.01); *H04L 63/0281* (2013.01);
(Continued)

(58) Field of Classification Search
CPC ..... G06F 21/316; H04L 63/08; H04L 63/105; H04L 63/0272; H04L 63/162; H04L 63/1433; H04L 63/0281; H04L 63/0876
See application file for complete search history.

(56) References Cited

U.S. PATENT DOCUMENTS

| 8,584,219 B1 | 11/2013 | Toole et al. |
| 2008/0098469 A1 | 4/2008 | Morijiri et al. |

(Continued)

FOREIGN PATENT DOCUMENTS

| WO | 2014202718 | 12/2014 |
| WO | 2018126013 | 7/2018 |

OTHER PUBLICATIONS

International Searching Authority, "International Search Report and Written Opinion," issued in connection with International Patent Application No. PCT/US2017/068723, dated May 4, 2018, 13 pages.

(Continued)

*Primary Examiner* — Amir Mehrmanesh
(74) *Attorney, Agent, or Firm* — Hanley, Flight & Zimmerman, LLC

(57) ABSTRACT

Context-based authentication in a secure network comprised of multiple programmable devices is described. A machine readable storage device or storage disk includes instructions that, when executed, cause a machine to obtain, from a programmable device, identity data and contextual data associated with a current authentication attempt by a user attempting to access a secure network. The contextual data indicates a number of authentication factors implementable by the programmable device in connection with the current authentication attempt. The instructions further cause the machine to determine a pattern associated with authentication of the user. The instructions further cause the machine to determine, based on the identity data, the number of authentication factors, and the pattern, a risk level associated with the current authentication attempt. The instructions further cause the machine to request additional identity data in response to the risk level not satisfying a threshold. The instructions further cause the machine to determine whether to permit access to the secure network based on the current authentication attempt and the additional identity data.

17 Claims, 6 Drawing Sheets

(52) U.S. Cl.
CPC ............ *H04L 63/08* (2013.01); *H04L 63/105* (2013.01); *H04L 63/1433* (2013.01); *H04L 63/162* (2013.01); *H04W 12/06* (2013.01)

(56) References Cited

U.S. PATENT DOCUMENTS

| | | |
|---|---|---|
| 2009/0080408 A1 | 3/2009 | Natoli et al. |
| 2011/0225625 A1 | 9/2011 | Wolfson et al. |
| 2011/0314558 A1 | 12/2011 | Song et al. |
| 2012/0323997 A1 | 12/2012 | Mezhibovsky et al. |
| 2013/0269013 A1 | 10/2013 | Parry et al. |
| 2014/0237591 A1 | 8/2014 | Niemela et al. |
| 2016/0134634 A1 | 5/2016 | Rosendal et al. |

OTHER PUBLICATIONS

United States Patent and Trademark Office, "Non-Final Office Action," issued in connection with U.S. Appl. No. 15/392,454, dated Sep. 7, 2018, 21 pages.

United States Patent and Trademark Office, "Notice of Allowance and Fee(s) Due," issued in connection with U.S. Appl. No. 15/392,454, dated Jan. 31, 2019, 29 pages.

International Bureau, "International Preliminary Report on Patentability," issued in connection with International Patent Application No. PCT/US2017/068723, dated Jul. 11, 2019, 7 pages.

FABRIC ASSISTED IDENTITY AND AUTHENTICATION

RELATED APPLICATIONS

This application arises from a continuation of U.S. patent application Ser. No. 15/392,454, filed Dec. 28, 2016, entitled "Fabric Assisted Identity and Authentication." The entirety of U.S. patent application Ser. No. 15/392,454 is hereby incorporated herein by reference.

TECHNICAL FIELD

Embodiments described herein generally relate to the field of authentication (e.g., restricting access by persons to machines, places, and/or data, etc.). More particularly, embodiments described herein relate to context-aware authentication techniques.

BACKGROUND ART

Programmable devices—such as internet of things (IoT) devices, mobile computing devices, desktop computing devices, and cloud computing devices—can make up a computer network of interconnected programmable devices (hereinafter "a computer network"). A user operating one of these programmable devices may have to be authenticated before access is granted to the computer network.

Authentication can be defined as one or more processes used to verify a user identity attempting to access a secure computer network. In general, authentication includes comparing identity data (that is provided by a user attempting to gain access to a secure computer network) to stored information comprising authorized users' information.

Conceptually, identity data can be broken up into three authentication factors—(i) a knowledge factor, which is information known to the user (e.g., a password, a username, etc.); (ii) an ownership factor, which is a physical or virtual object possessed by the user (e.g., an identification card, a security token, a software token, a hardware token, a device with a hardware and/or software token, etc.); and (iii) an inherence factor, which is an intrinsic characteristic of a user (e.g., fingerprint, retinal pattern, DNA sequence, face, voice, unique bio-electric signals, other biometric identifier, etc.).

Based on the factors above, there are different types of authentication—single-factor authentication, two-factor authentication, and multi-factor authentication. The higher the number of authentication factors used in an authentication technique, the stronger and less prone to security compromises (e.g., man-in-the-middle attacks, etc.) that the authentication technique will be.

Many organizations use single-factor, two-factor, and/or multi-factor authentication for granting access to their secured systems. One issue associated with these techniques of authentication is their inability to take context or risk into account when attempting to authenticate an individual. For example, an authentication technique will always require a user's username and password regardless of whether the user is accessing an organization's information system from a secure terminal (e.g., an organization-approved computer system, etc.) or from a unsecure terminal (e.g., the user's personal computer system, etc.).

Even though a secure network that always requires the use of one or more factors for access may protect against unauthorized access, such a system may also be an inefficient system. For example, a significant amount of resources (e.g., human resources, computer resources, etc.) must be maintained and deployed each time a user attempts to access the secure network. As the number of users with authenticated access to such a system increases, the amount of resources associated with authentication can increase significantly.

DESCRIPTION OF EMBODIMENTS

Figure 1:
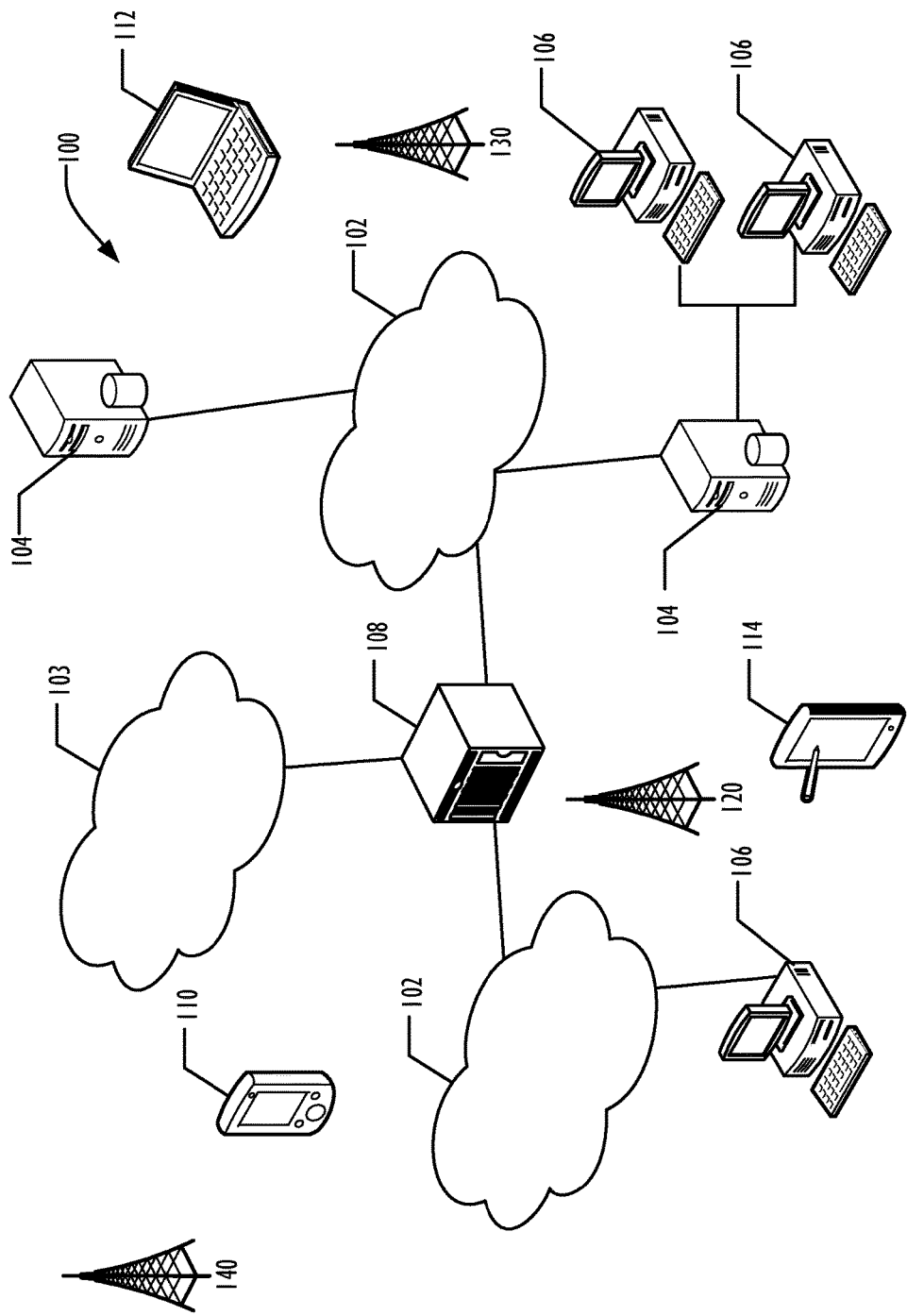
FIG. 1 is a block diagram illustrating a computer network capable of performing context-aware authentication according to one embodiment.

Embodiments described herein relate to context-aware authentication techniques. As such, one or more of the embodiments described herein acts as an improved alternative to one or more currently-available authentication techniques that fail to factor in context or risk. Consequently, at least one of the embodiments described herein is directed to improving computer functionality by intelligently improving authentication techniques used for accessing secure networks. In particular, at least one of the embodiments described herein can assist with dynamically adjusting an amount of authentication required for a user to gain access to a secure network based on one or more attributes associated with the user. This dynamic adjustment of authentication requirements can in turn assist with minimizing or eliminating risks to the operational integrity of a secure network caused by vulnerabilities in the authentication technique on an as-needed basis. In this way, computer resources associated with authentication can be utilized more efficiently.

In the following description, for purposes of explanation, numerous specific details are set forth in order to provide a thorough understanding of the embodiments described herein. It will be apparent, however, to one skilled in the art that the embodiments described herein may be practiced without these specific details. In other instances, structure and devices are shown in block diagram form in order to avoid obscuring the embodiments described herein. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter in the embodiments described herein. As such, resort to the claims is necessary to determine the inventive subject matter in the embodiments described herein. Reference in the specification to "one embodiment," "an embodiment," "another embodiment," or their variations means that a particular feature, structure, or characteristic described in connection with the embodiments is included in at least one of the embodiment described herein, and multiple references to "one embodiment," "an embodiment," "another embodiment," or their variations should not be understood as necessarily all referring to the same embodiment.

As used herein, a "computer network," a "network," and their variations refer to a collection of interconnected computing devices that can exchange data with each other. Examples of a computer network include, but are not limited to, a peer-to-peer network and a network based on the client-server model. In a computer system, interconnected computing devices exchange data with each other using a communication mechanism. The connections between interconnected computing devices are established using either wired or wireless communication mechanisms. Examples of communication mechanisms include, but are not limited to, any type of data network such as a local area network (LAN), a wide area network (WAN) such as the Internet, a fiber network, a storage network, or a combination thereof, wired or wireless. The communication mechanisms also include networking hardware (e.g., switches, gateways, routers, network bridges, modems, wireless access points, networking cables, line drivers, switches, hubs, repeaters, etc.).

As used herein, a "computing device," a "programmable device," and its variations refer to a device that can be instructed to carry out a set of arithmetic or logical operations automatically. In some embodiments, a computing device comprises one or more of a processing element (e.g., a central processing unit (CPU), a microprocessor, etc.), some form of memory, and peripheral interfaces. Examples include, but are not limited to, a mobile computing device, a lap top computer, a wearable computing device, a network device, an internet of things (IoT) device, a cloud computing device, a vehicle, a smart lock, etc.

As used herein, a "secure network," a "secure computer network," and their variations refer to a computer network that requires end-users to authenticate themselves before the end-users can access the network. Authentication can be achieved using any known authentication technologies (e.g., an authentication service, an authentication server, etc.).

As used herein, a "context-aware network" and variations thereof refer to an adaptive system, including a security system, of interconnected services that communicate and share information to make real-time, accurate decisions by individual products and/or as a collective. In one example, the context-aware network is achieved using an enterprise service bus (ESB) that interconnects at least some of the programmable devices in a computer network.

As used herein, an "enterprise service bus" ("ESB") and variations thereof refer to a software-based network architecture that provides a medium of data exchange over a service-oriented architecture. In some embodiments, an ESB is a special case of a client-server software architecture in which clients may route messages or gathered data through a server.

As used herein, a "data exchange layer" ("DXL") and variations thereof refer to a type of ESB that is suitable for exchange of security-related messages (e.g., gathered data associated with authentication, context-based authentication messages based on processing of the gathered data, etc.). In this way, a DXL can assist with providing a context of a user attempting to access a secure network. An example of a DXL is the McAfee® Data Exchange Layer (DXL). (MCAFEE is a registered trademark of McAfee, Inc.).

FIG. 1 is a schematic diagram of an embodiment of a computer network 100 where embodiments of the present disclosure may operate. Computer network 100 comprises a plurality of communication mechanisms 102, where each of the communication mechanisms 102 may contain a number of other devices (e.g., microcontrollers, embedded systems, industrial control computing modules, etc.). Specifically, communication mechanisms 102 comprise one or more different types of computer networks available today, such as the Internet, enterprise networks, data centers, a wide area networks (WAN), and/or a local area networks (LAN). Each of these networks within communication mechanisms 102 may contain wired and/or wireless programmable devices that operate in the electrical and/or optical domain, and also employ any number of network communication protocols (e.g., TCP/IP). For example, one or more of the networks within communication mechanisms 102 may be a wireless fidelity (Wi-Fi®) network, a Bluetooth® network, a ZigBee® network, and/or any other suitable radio based network as would be appreciated by one of ordinary skill in the art upon viewing this disclosure.

Communication mechanisms 102 may also comprise switches, routers, and/or other network hardware devices configured to transport data over communication mechanisms 102. Moreover, communication mechanisms 102 may be configured to implement computer virtualization, such as virtual private network (VPN) and/or cloud based networking. FIG. 1 illustrates that communication mechanisms 102 may be connected to computing devices 106, computer servers 104, and one or more network nodes 108, which include, but are not limited to, gateways, routers, and/or wireless access points. The computing devices 106 and/or computer servers 104 may each comprise a plurality of virtual machines (VMs), containers, and/or other types of virtualized computing systems for processing computing instructions and transmitting and/or receiving data over communication mechanisms 102. For example, the computing devices 106 and computer servers 104 may be configured to support a multi-tenant architecture, where each tenant may implement its own secure and isolated virtual network environment. Although not illustrated in FIG. 1, the computer network 100 may use communication mechanisms 102 to connect a variety of other types of computing devices, such as VMs, containers, hosts, storage devices, electronic devices (e.g., wearable electronic devices), and/or any other electronic device capable of transmitting and/or receiving data over communication mechanisms 102. The functionality of the network node(s) 108 may be implemented in any device or combination of devices illustrated in FIG. 1; however, most commonly is implemented in a firewall or intrusion protection system in a gateway or router.

As shown in FIG. 1, computer network 100 may also comprise a cellular network 103 for use with mobile communication devices. The cellular network 103 may be capable of supporting of a variety of devices that include, but are not limited to computers, laptops, and/or a variety of mobile devices (e.g., mobile phones). Using FIG. 1 as an example, devices in the computer network 100 may communicate via the cellular network 103 are illustrated as mobile phones 110, laptops 112, and tablets 114. A mobile device, such as mobile phone 110, may interact with one or more mobile provider networks as the mobile device moves, typically interacting with a plurality of mobile network towers 120, 130, and 140 for connecting to the cellular network 103. Although referred to as a cellular network 103 in FIG. 1, a mobile device may interact with towers of more than one provider network, as well as with multiple non-cellular devices such as network node(s) 108. In addition, the mobile devices 110, 112, and 114 may interact with non-mobile devices such as computers 104 and computer servers 106 for desired services.

In one or more embodiments, one or more mobile devices (e.g., mobile phones 110, laptops 112, and tablets 114), computer servers 104, computing devices 106, and/or other devices may support trusted operations through the employment of a trusted execution environment (TEE). For example, a TEE may implemented using Intel® Software Guard Extensions (SGX), Intel® Converged Security Engine (CSE), Intel® Virtualization Technology, ARM® TrustZone® technology, and/or Intel® Manageability Engine (ME). (INTEL is a registered trademark of Intel Corp. ARM and TRUSTZONE are registered trademarks of ARM Limited.) Trusted networks may be formed dynamically using trusted discovery which allows trusted network devices to discover other trusted network devices, or trusted network nodes, that include a trusted entity. For purposes of the current disclosure, trusted networks may be formed by any means that allow services on trusted devices to remain opaque to network devices that are not part of the trusted network. Whereas untrusted discovery may reveal whether a particular node or network device may support trusted discovery, trusted discovery may be necessary to reveal additional trusted capabilities and services among trusted devices. Some examples of protocols that may be revealed only by trusted discovery include attestation, key agreement, group formation, trusted proxy, and provisioning. At least some embodiments of the context-aware authentication described herein occurs within a TEE. For example, one or more logic/modules within or coupled to one or more mobile devices (e.g., mobile phones 110, laptops 112, and tablets 114), computer servers 104, computing devices 106, and network node(s) 108 used for acquisition and/or processing of data associated with context-aware authentication operates within a TEE.

In one embodiment, one or more of the network node(s) 108 and the computer server(s) 104 acts as an authentication entity that executes an authentication service. That is, the node(s) 108 and/or the server(s) 104 work together to perform one or more of techniques used to verify a user identity attempting to access the secure computer network 100 via one or more mobile devices (e.g., mobile phones 110, laptops 112, and tablets 114) and/or computing devices 106.

As described above, the computer network 100 includes several components. In at least one embodiment, these components operate together as a context-aware network that includes a security system for facilitating context-aware authentication as described herein. Additional details about one or more embodiments of context-aware authentication are provided below in connection with one or more of FIGS. 2-6.

Figure 2:
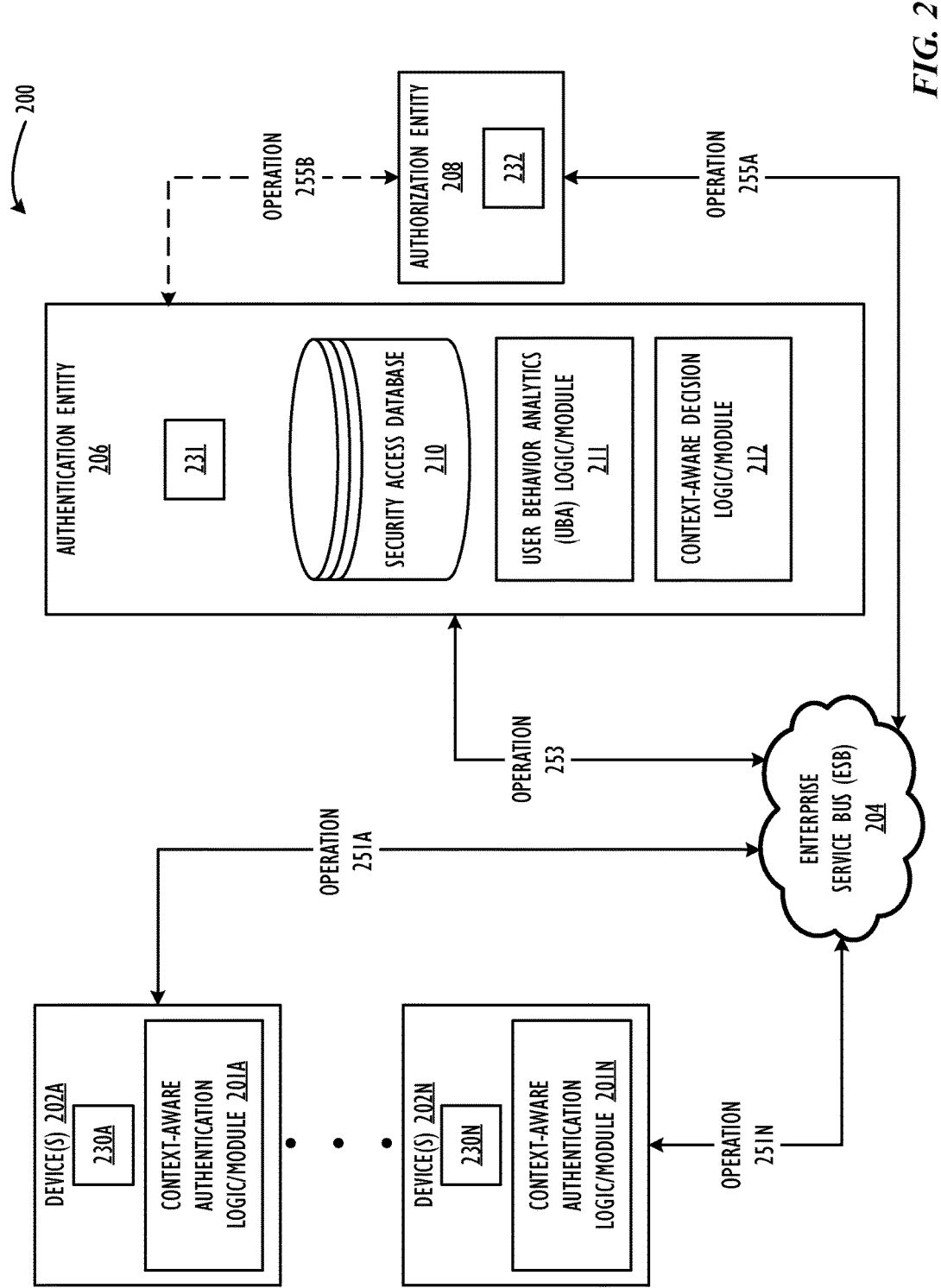
FIG. 2 is a sequence diagram illustrating a technique for context-aware authentication that is implemented in a context-aware network according to one embodiment. The context-aware network of FIG. 2 can be part of the computer network illustrated in FIG. 1.

Referring now to FIG. 2, which is a sequence diagram illustrating a technique 200 for context-aware authentication implemented via a context-aware network that includes a security system according to one embodiment. The context-aware network in FIG. 2 can be part of the computer network 100 described above in connection with FIG. 1. The context-aware network in FIG. 2 includes computing device(s) 202A-N, ESB 204, authentication entity 206, and authorization entity 208. Each of computing device(s) 202A-N, ESB 204, authentication entity 206, and authorization entity 208 may include wired communication mechanisms, wireless communication mechanisms, and all other necessary networking hardware and/or software required for communication. For brevity and to avoid obscuring the inventive concepts described herein, the data stores and/or computing devices to be accessed in response to successful authentication are not shown in FIG. 2.

Technique 200 begins at operations 251A-N. Here, users attempting to access a secure network (e.g., the computer network 100 of FIG. 1, etc.) via computing device(s) 202A-N enter into authentication sessions. For brevity, only operation 251A (and device 202A) will be described in connection with FIGS. 2, 3, 4, 5, and 6.

With regard again to FIG. 2, each device 202 can be associated with user identity (e.g., a user account, etc.). For example, an employee of an organization user may use his device 202A to access an intranet that accessible only to the organization's staff. Generally, a wide range of information and services from the organization's internal information technology (IT) systems are available that would not be available to the public. As such, a context-aware network that includes a security system (e.g., the context-aware network in FIG. 2, etc.) may be in place to ensure that only users with authorization (i.e., the organization's staff) have access to the intranet.

As shown in FIG. 2, each device 202 is a computing device that executes various types of processing including enabling a user of the device 202A-N to authenticate himself/herself via an authentication session in order to gain access to a secure network. In one embodiment, the devices 202 includes or is coupled to a context-aware authentication logic/module 201 (described in further detail below). Also, the devices 202 can include one or more electronic components 230 used to implement the context-aware authentication logic/module 201. Examples of the one or more electronic components 230 include: processing unit(s) (such as microprocessors, co-processors, other types of integrated circuits (ICs), etc.); corresponding memory; and/or other related circuitry. In some embodiments, the context-aware authentication logic/module 201 is implemented as one or more special-purpose processors with tamper resistance features. Examples of such special-purpose processors include a trusted platform module cryptoprocessor, an application specific integrated circuit, an application-specific instruction set processor, a field programmable gate array, a digital signal processor (DSP), any type of cryptographic processor, an embedded processor, a co-processor, or any other type of logic with tamper resistance features that is capable of processing instructions. In this way, the context-aware authentication logic/module 201 can be implemented and maintained in a secure manner that assists with minimizing or preventing security vulnerabilities. For a further embodiment, the context-aware authentication logic/module 201 may be maintained separately from the components 230. For example, the context-aware authentication logic/module 201 may be implemented as one or more special-purpose processors that are separate from the components 230.

As explained above, the context-aware authentication logic/module 201 may be implemented by a processor. In a specific embodiment, the logic/module 201 operates within a trusted environment (e.g., a TEE, etc.). The logic/module 201 may be part of an authentication session. Other devices that are not shown in FIG. 2 that may also include the context-aware authentication logic/module 201 include access control devices, such as a door control systems, and/or other common security control devices. In one embodiment, the context-aware authentication logic/module 201 gathers at least some of the data associated with authenticating a user of the device 202 that is attempting to gain access to the computer network (e.g., network 100 of FIG. 1, etc.) being serviced by the context-aware network in FIG. 2. In an embodiment, the context-aware authentication logic/module 201 stores at least some of the data associated with authentication including, but not limited to, the following: (i) identity data used to facilitate authentication (e.g., private identifying information, legal identifying information, administrator-assigned credentials, etc.); and (ii) contextual data corresponding to the identity data (e.g., timestamp information, geolocation coordinates (e.g., Global Positioning System (GPS) coordinates), unique computer identifiers (e.g., internet protocol (IP) address, VPN address, etc.), random numbers, one time password (OTP) sequences, etc.). The gathered data may be communicated via an ESB 204 (described in further detail below) and stored in a security access database 210 (described in further detail below). Identity data can be any of three authentication factors. Examples of identity data include, but are not limited to, a user's social security number, a user's name, a user's contact information, a user's demographic data, a username and corresponding password; a physical or virtual object (e.g., a smart card, a public key infrastructure (PKI) certificate, a digital token, etc.); biometrics, and/or a set of questions that the user must answer. The database 210 may be any suitable data store, including a structured or relational database, a distributed database, an operational database, an object-oriented database, a multi-dimensional database, etc.

In one embodiment, operation 251 includes the logic/module 201 communicating the data gathered by the logic/module 201 via an ESB 204. The ESB 204, in one embodiment, is a software-based network architecture that provides a medium for secure data exchange within the context-aware network of FIG. 2. In some embodiments, an ESB is a special case of a client-server software architecture in which clients (e.g., computing devices, servers, network nodes, etc.) may route messages or gathered data through one or more ESB servers. The ESB 204 can reside in any network element, including a dedicated computer, an Ethernet switch, an access point, a network access server, and any other known technology capable of implementing a medium for secure data exchange within a context-aware network. For example, the ESB 204 is implemented in one or more network nodes (e.g., network node(s) 108 in FIG. 1, etc.) and/or one or more computer servers (e.g., computer server(s) 104 in FIG. 1, etc.). Additional details about the ESB 204 are described below in connection with at least FIG. 3.

Technique 200 proceeds to operation 253, where an authentication entity 206 receives the gathered data via the ESB 204. In one embodiment, the authentication entity 206 can be a network service that facilitates authentication of a user of device 202A attempting to access a network (e.g., the network 100 of FIG. 1, etc.). The authentication entity 206 can reside in any network element, including a dedicated computer, an Ethernet switch, an access point, a network access server, and any other known technology capable of implementing an authentication service. For example, the authentication entity 206 is implemented in one or more network nodes (e.g., network node(s) 108 in FIG. 1, etc.) and/or one or more computer servers (e.g., computer server(s) 104 in FIG. 1, etc.). In one embodiment, the authentication entity 206 includes one or more of a security access database 210, a user behavior (UBA) logic/module 211, and a context-aware decision logic/module 212. In a specific embodiment, one or more of the database 210, the UBA logic/module 211, and the context-aware decision logic/module 212 is implemented in one or more electronic components 231. Examples of the one or more electronic components 231 include: processing unit(s) (such as microprocessors, co-processors, other types of integrated circuits (ICs), etc.); corresponding memory; and/or other related circuitry.

In one embodiment, operation 253 includes organizing/storing the gathered data into a security access database 210. The security access database 210 can be a collection of information that includes the gathered data (i.e., the identity data and the contextual data) organized in such a way that a computing device can select, process, and/or update desired pieces of data. A UBA logic/module 211 may use the gathered data in the security access database 210 for further processing. For example, and in one embodiment, the UBA logic/module 211 may process the gathered data using user behavior analytics (UBA) technologies to identify one or more patterns associated with user behaviors. As used herein, "user behavior analytics," "UBA," and their variations refer to a cybersecurity process for detection of insider threats, targeted attacks, and security vulnerabilities within a computer network. UBA technologies collect and analyze patterns of users' data and activities. For example, one UBA technique includes collecting and analyzing human behavior (e.g., network log-in times, network log-out times, geolocations associated with accessing a network, etc.) and then applying algorithms and statistical analysis to detect meaningful anomalies from those patterns—anomalies that indicate potential threats. The results of the processing performed by the UBA logic/module 211 may be stored in the security access database 210. UBA technologies are known so they are not described in detail in this document.

In at least one embodiment, operation 253 also includes providing the information stored in the security access database 210 to a context-aware decision logic/module 212, which may be part of the authentication entity 206 (as shown in FIG. 2). When a user of device 202A attempts to access a computer network (e.g., the network 100 of FIG. 1, etc.), the context-aware decision logic/module 212 uses the information associated with the current authentication session (i.e., the current identity data and the current contextual data being used for the current authentication session) and the data stored in the security access database 210 to determine a risk level associated with the current authentication session. If the risk level fails to exceed a threshold, the decision logic/module 212 does not trigger additional authentication sessions for the user of device 202. That is, the decision logic/module 212 will "inform" the authentication entity 206 to grant the user of device 202 access to the secure network based on the current authentication session (assuming the identity data used by the user of device 202 is in fact the correct information for successful authentication). Alternatively, if the risk level exceeds the threshold, the decision logic/module 212 triggers additional authentication sessions for the user of device 202A. Here, the decision logic/module 212 will cause the authentication entity 206 to request additional identity data from the user to establish confidence that the user is in fact who he/she claims to be. In some embodiments, each of the risk level and the threshold may be represented as a value (e.g., a number, an array of numbers, etc.). In one embodiment, the decision logic/module 212 uses the results of the UBA logic/module 211 stored in the security access database 210 together with the data gathered by the context-aware authentication logic/module 201 to determine whether a user of device 202 will be granted access based on the current authentication session. For example, if a user attempts to access a secure network (e.g., the network 100, etc.) via the computing device 202A at 3:00 AM, the decision logic/module 212 can use the data in the security access database 210 to determine whether this attempt complies with the user's known behavior patterns. In this example, if the decision logic/module 212 determines that the behavior is legitimate because it complies with what is known about the user (i.e., the user normally accesses the secure network during early morning hours), then the decision logic/module 212 will notify the authorization entity 206 that the user may be granted access without additional identity data being requested from the user (assuming the current identity is the current identity data for authentication). On the other hand, if the decision logic/module 212 determines that the attempt does not conform to the user's known behavior patterns (i.e., the user hardly or never accesses the secure network during early morning hours), then the decision logic/module 212 will cause the authentication entity 206 to request additional identity data from the user. In one or more embodiments, the authentication entity 206's request is randomized. That is, the requested additional data is different each time such a request is triggered. In this way, the user (or a malicious party acting as the user) cannot predict what type of additional identity data is needed. This can assist with strengthening the authenticating technique 200 and with minimizing or eliminating unauthorized individuals (e.g., hackers, etc.) from accessing the network 100.

In some scenarios, a user of device 202A may fail to provide the proper credentials required for access to the secure network. These proper credentials include the initial identity data for the current authentication session, the contextual data associated with the initial identity data, and the additional identity data requested by the authentication entity 206. In such scenarios, an authorization entity 208 can be invoked. The authorization entity 208 can, in one embodiment, implement one or more authorization services associated with granting the user of device 202 with approval to access the secure network and/or approval to perform one or more actions within the secure network. The authorization entity 208 can, for example, include one or more electronic components 232 (including software and/or hardware) that enable one or more network administrators to grant authorization to a user of device 202, register the user's identity data with the authentication entity 206, and/or reset the user's authentication factors. Examples of the one or more electronic components 232 include: processing unit(s) (such as microprocessors, co-processors, other types of integrated circuits (ICs), etc.); corresponding memory (storing data including software); and/or other related circuitry. In one embodiment, the authorization entity 208 is implemented in one or more network nodes (e.g., network node(s) 108 in FIG. 1, etc.) and/or one or more computer servers (e.g., computer server(s) 104 in FIG. 1, etc.). As shown in FIG. 2, technique 200 can include one or more operations 255A and 255B. In one embodiment, operation 255A includes the authentication entity 206 communicating with the authorization entity 208 via the ESB 204. In one embodiment, operation 255B includes the authentication entity 206 communicating directly with the authorization entity 208 without using the ESB 204.

In at least one embodiment, each of operations 251, 253, and 255A-B can include generating and presenting a user interface on a display to present information related to the technique 200. For example, a user interface (e.g., a graphical user interface, etc.) can be generated and presented on a display of device 251 to request identity data from the user, to present acquired contextual data associated with the user, to present the determined risk level associated with the user, to indicate that additional identity is required from the user, to present information associated with invoking an authorization entity 208, etc.

As shown above, technique 200 is directed to a context-aware authentication technique. This technique 200 can assist with improving computer functionality by intelligently improving authentication techniques used for accessing a secure computer network. In particular, at least one embodiment of the technique 200 described herein can assist with dynamically adjusting authentication requirements required for a user to gain access to a secure network based on one or more attributes associated with the user. This dynamic adjustment of authentication requirements can in turn assist with minimizing or eliminating risks to the operational integrity of a secure network caused by vulnerabilities in the authentication technique on an as-needed basis. In this way, computer resources associated with authentication can be utilized more efficiently.

Figure 3:
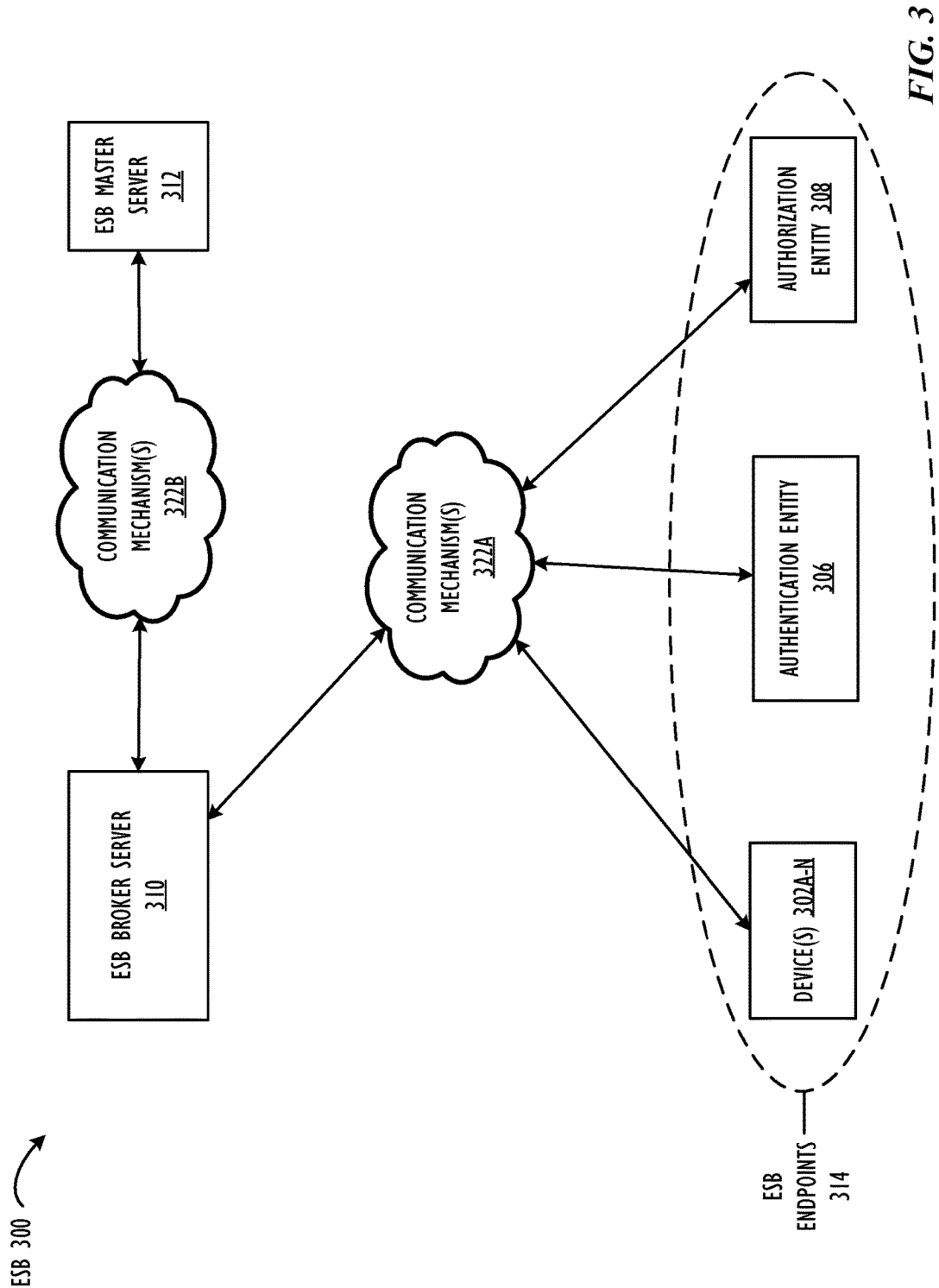
FIG. 3 is a block diagram illustrating an enterprise service bus (ESB) for use in context-aware authentication according to one embodiment. The ESB of FIG. 3 can be part of the context-aware network illustrated in FIG. 2.

FIG. 3 is a block diagram illustrating an enterprise service bus (ESB) 300 for use in context-aware authentication according to one embodiment. The ESB 300 can be part of the context-aware network illustrated in FIG. 2. In one embodiment, the ESB 300 provides a specific architecture for communication within a context-aware network (e.g., the network in FIG. 2, etc.). In one embodiment, the ESB 300 comprises one or more ESB endpoints 314, at least two sets of communication mechanism(s) 322A-B, an ESB broker server 310, and an ESB master server 312.

As shown in FIG. 3, the computing devices configured to exchange data via the ESB 300 may be referred to as ESB endpoints 314. These may include a plurality of device(s) 302A-N (which is the same as or similar to the plurality of devices 202A-N described above in connection with FIG. 2), an authentication entity 306 (which is the same as or similar to the authentication entity 206 described above in connection with FIG. 2), and an authorization entity 308 (which is the same as or similar to the authorization entity 208 described above in connection with FIG. 2). In one embodiment, the ESB endpoints 314 exchange identity data and contextual data associated with authentication in a secure environment provided by the ESB 300. That is, in this embodiment, the ESB 300 acts a specialized communication fabric. In a further embodiment, the ESB 300 may be provided on top of an existing communication network, such as a local area network (LAN).

The communication mechanism(s) 322A-B of the ESB 300 may include any type of physical or virtual network connection over which appropriate data may pass. The ESB 300 includes any network technology or topology suitable for message exchange. In one embodiment, the ESB 300 utilizes message queuing telemetry transport messages for data exchange.

The ESB 300 includes an ESB broker server 310, which may be configured to provide ESB messaging services, such as maintaining ESB routing tables and delivering messages. In one embodiment, all data communicated between the endpoints 314 passes through the ESB broker server 310. This can assist with being minimizing or eliminating attacks by malicious parties (e.g., man-in-the-middle attacks, etc.) that attempt to steal identity data and/or contextual data associated with authentication.

In at least one embodiment, the ESB master server 312 is communicatively coupled to the ESB broker server 310 via the communication mechanism(s) 322B. The ESB master server 312 may maintain domain data in a data store (not shown). For example, the ESB master server 312 may maintain domain data on a memory that is local to the ESB master server 312, or memory that is coupled to the ESB master server 312. This memory may be separately or remotely hosted.

The ESB 300 can, for example, operate as follows. A device 302A (e.g., a mobile computing system, a wearable, a vehicle, etc.) connects to the communication mechanism(s) 322A (e.g., a LAN, etc.) and receives a new unique identifier (e.g., an IP address, etc.). At this point, identity data and contextual data (collectively referred to as "gathered data") corresponding to the connected device 302A becomes known or knowable to the authentication entity 306, the authorization entity 308, and/or the ESB broker server 310. This gathered data includes any known identity data and/or contextual data associated with authentication as described above in connection with one or more of FIGS. 1 and 2 above. Examples include, but are not limited to, the unique computer identifiers (e.g., IP address, VPN address, etc.) associated with the device 302A, information about an operating system running on the device 302A, the username for the user logged on to the device 302A, timestamp information associated with the connection of the device 302A to the communication mechanism(s) 322A, geolocation coordinates (e.g., GPS coordinates) associated with the device 302A, random numbers generated in response to the device 302A connecting to the communication mechanism(s) 322A, OTP sequences required for the device 302A to connect to the communication mechanism(s) 322A, etc.

In one embodiment, the device 302A publishes one or more messages to report the gathered data associated with the device 302A to the ESB broker server 310. In yet another embodiment, the authentication entity 306 and/or the authorization entity 308 may also publish one or more messages to report the gathered data associated with the device 302A to the ESB broker server 310. The ESB broker server 310 provides the gathered data associated with the device 302A to the ESB master server 312 via the communication mechanism(s) 322B. Here, the ESB master server 312 is responsible for maintaining the records of the gathered data associated with the device 302A.

The ESB master server 312 may combine and reconcile the gathered data associated with the device 302A that is received from the two sources into a single record of truth, containing single values for the gathered data. For example, if the ESB master server 312 receives the gathered data associated with the device 302A from the device 302A itself and from the authentication entity 306, the ESB master server 312 reconciles these records to determine a single "correct" version of the gathered data. The reconciled version of the gathered data may be persistently stored in a domain database, and the ESB master server 312 may then publish the reconciled version of the gathered data on the ESB 300. The broker server 310 may then forward the published message to one or more of the endpoints 314.

The ESB 300 may be based on a two-layer protocol. The "bottom" layer is a secure, reliable, low-latency data transport fabric that connects diverse security elements as a mesh, or in a hub-and-spoke configuration. The "top" layer is an extensible data exchange framework that is configured to facilitate trustworthy data representation. In an example, the endpoints 314 connect to the ESB 300. Each endpoint 314 is assigned a distinct identity, and authenticates itself to authentication entity 306 upon connection via the communication mechanism(s) 322A. Each endpoint 314 may establish one-to-one communications via the ESB 300, for example by sending a message addressed to an endpoint 314 with a specific identity. This enables endpoints 314 to communicate with each other without having to establish a point-to-point network connection. In another example, one or more of the ESB endpoints 314 "subscribe" to messages of a certain type. When an endpoint 314 "publishes" a message of that type on the ESB 300, all other endpoints 314 that subscribe to the message will receive and process the message, while non-subscribers may safely ignore it. In yet another example, one endpoint 314 may publish a request over the ESB 300. Here, an appropriate one of the other endpoints 314 receiving the request may provide a response. Advantageously, the response may be used by more than just the endpoint 314 that originally published the request. For example, after the authentication entity 306 publishes a request for gathered data associated with the device 302A and receives the requested data, the entity 306 can also publish the requested information on the ESB 300. In this way, other endpoints 314 (e.g., the authorization entity 308, etc.) that find instances of the requested data may benefit from the published data without having to request it.

The ESB 300 may be implemented using diverse software elements, patterns, and constructs suited to the specific infrastructure connecting the security elements. For instance, in a physical enterprise network, messaging middleware consisting of multiple interconnected message brokers may be deployed, where endpoints 314 connect to the closest broker 310 in an ESB 300 comprised of multiple brokers 310. In a virtual network infrastructure, the fabric may leverage hypervisor provided channels.

In one embodiment, the ESB master server 312 may transform data received from the ESB endpoints 314 into a well-understood, standardized representation. This representation may be published on ESB 300, so that all endpoints 314 receive usable data. In some embodiments, each of the endpoints 314 includes an ESB logic/module (e.g., the context-aware authentication logic/module 201A, the context-aware decision logic/module 212, etc.) that enables the respective endpoint 314 to use its own local APIs for querying and receiving data. To increase network efficiently, the endpoints 314 may cache received data locally, until such data is superseded by an authorized message. For example, the authentication entity 306 may subscribe to publications about the gathered data for one or more of the devices 302A-N. When such publications are made, the authentication entity 306 may store the gathered data in a local database (e.g., the security access database 210 described above in connection with FIG. 1, etc.). The stored gathered data may be used until it is superseded by updated publications.

Figure 4:
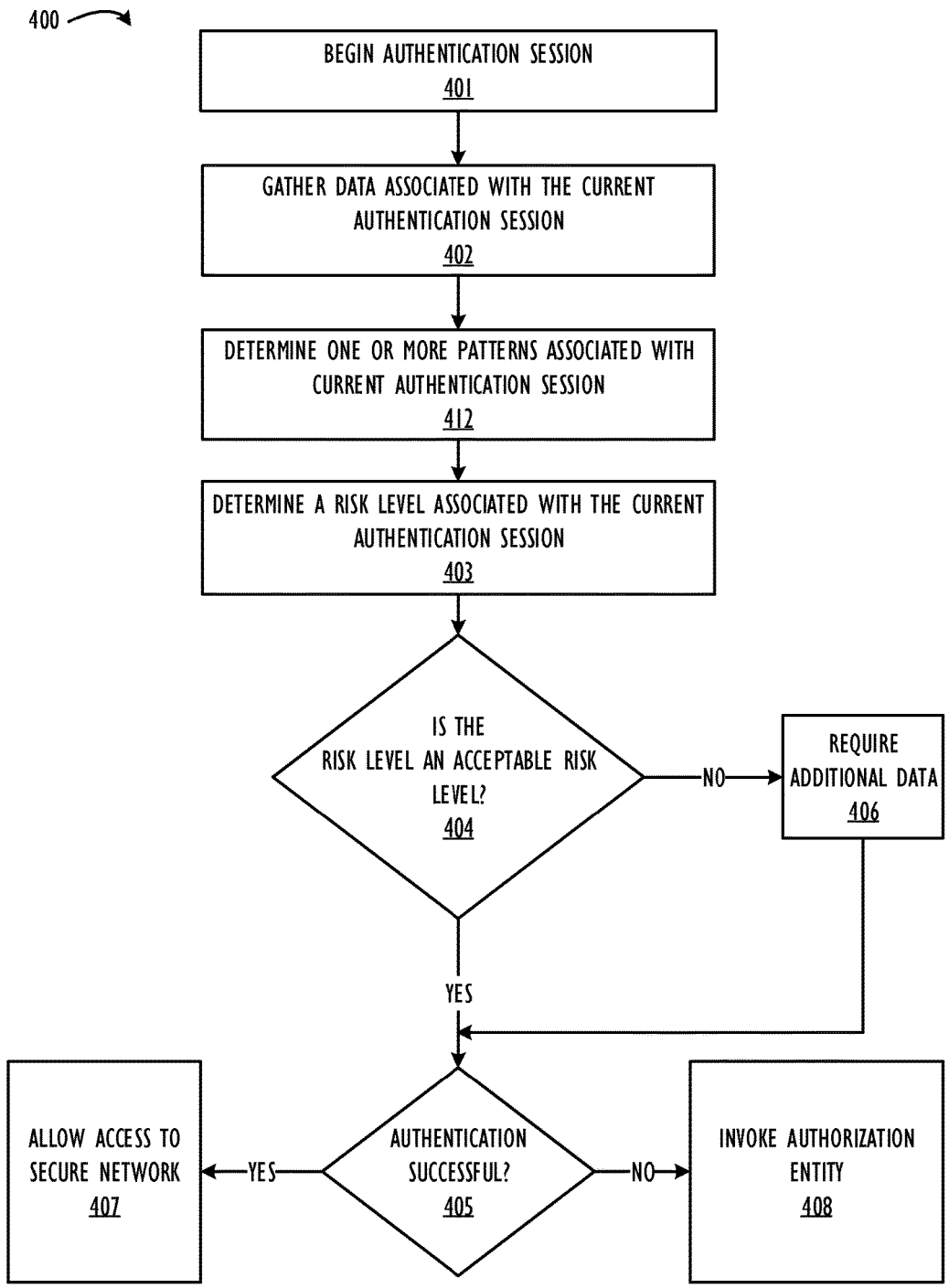
FIG. 4 is a flowchart illustrating a technique for context-based authentication according to one embodiment.

FIG. 4 is a flowchart illustrating a technique 400 for context-based authentication according to one embodiment. The technique 400 can be performed by one or more elements of the network 100 described above in connection one or more FIGS. 1-3. For example, a processor (e.g., a TEE of a processor, a cryptoprocessor with tamper resistance features, any processor known in the art, etc.) implementing a network node 108 and/or a server 104 as described above in connection with FIG. 1, etc. Technique 400 includes some elements of the network 100 described above in connection one or more FIGS. 1-3. For the sake of brevity, these elements are not described again.

Technique 400 begins at operation 401, where an authentication session is initiated. Generally, one or more computing devices (e.g., devices 114, 112, 110, 106 of FIG. 1, devices 202A-N of FIG. 2, devices 302A-N of FIG. 3, etc.) authenticates with its credentials and receives a session identifier (which can, for example, be stored in a cookie). In some scenarios, the session identifier may be considered a token because it is the equivalent of a set of credentials. An authentication entity 206 associates the session identifier with a user account (e.g. in memory, or in a database). In at least one embodiment, a user interface (e.g., a graphical user interface, etc.) can be used for operation 401. The entity 206 can also restrict or limit the authority associated with the session identifier to certain operations or a certain time period. Additionally, the entity 206 may invalidate the session identifier and revoke the granted authority associated with the session identifier if or when there are security concerns. Generally, changes to the authorizations granted to a session identifier can be changed using policies set by one or more network administrators. Another feature of a session identifier is that its enables tracking the activities undertaken by a user associated with the session identifier while he/she is granted access to the secure network.

At operation 402, technique 400 includes gathering data associated with the current authentication session. In one embodiment, the gathered data is similar to or the same as the gathered data described above in connection with one or more FIGS. 1-3. In at least one embodiment, a user interface (e.g., a graphical user interface, etc.) can be used to present the information gathered during operation 402. In some embodiments, the gathered data can be deemed attributes associated with a user account that corresponds to the device on which authentication is performed. In one embodiment, these attributes are unique markers associated with the user account for determining a risk level associated with the current authentication session of the user account. The gathered data can also include identity data and contextual data that has been acquired over a period of time (e.g., data associated with prior authentication sessions for that specific user account, etc.). In one embodiment, technique 400 proceeds to operation 412. Here, machine learning is applied to the gathered data to identify the user requesting access to a secure network and the risk level associated with the current authentication session. In one embodiment, the gathered data/attributes are categorized as follows:

Access Type—This data refers to the known status of the device being used for authentication, including device identifying information (e.g., unique computer identifiers, etc.). More specifically, a risk level is determined, increased, or decreased based on whether the user account is requesting access to a secure network through a personal device, a mobile device, a networked device, a public shared device, or other device. For example, when the user attempts to access the secure network from a network-approved device (a device assigned by the owner of the secure network, etc.), the authentication attempt may be deemed less risky than when the user attempts to access the secure network via a personal device that has not been approved by the owner of the secure network.

Attribute Type—This data refers to location and communication mechanisms (e.g., LAN, WAN, etc.) being used to request access to a secure network. Here, a risk level is determined, increased, or decreased based on a location and/or a communication mechanism associated with the current authentication session. For example, when a user attempts to access the secure network via a physical communication mechanism (e.g., a wired connection), the wired connection may be deemed less risky than when the user attempts to access the secure network via a virtual communication mechanism (e.g., a wireless connection). Additionally, the larger the distance between a geolocation where the user attempts to access the secure network and a predetermined "safe" geolocation can also be used to determine a risk level of the attempted access. Examples of a "safe" geolocation include, but are not limited, an address associated with the owner of the secure network.

Attribute Accuracy—Depending on the attribute type, this data relates to the number of authentication factors that can be implemented from the attribute type. Here, a risk level is determined, increased, or decreased based on a presence or absence of an authentication factor to the user requesting access. For example, if one form of authentication requires the user to authenticate via inputs provided in response to a telephone call, but the user is unable to receive the call, then this failure can be used to elevate a risk level of attempted access.

Frequency and Manner of Authentication attempts—This data relates to the speed with which the user attempts to re-authenticate or retry, the known times when the user is likely to access the secure network, and the known behavior about the user's authentication patterns. Based on this data, a risk level associated with the attempted access can be determined, reduced, or increased. For example, if a user attempts to access a secure network at 3:00 AM, the data in the security access database can be used to determine whether this attempt complies with the user's legitimate behavior patterns. In this example, if a determination is made that the behavior is legitimate (e.g., the user normally accesses the secure network during early morning hours), then a risk level can be minimal or non-existent. On the other hand, if a determination is made that the attempt does not conform to the user's legitimate behavior patterns (e.g., the user hardly or never accesses the secure network during early morning hours), then a risk level can be increased.

In response gathering the data/attributes and determining the pattern(s), technique 400 performs operation 403. Here, gathered data/attributes and/or the pattern(s) are processed to determine a risk level associated with the current authentication session. In at least one embodiment, a user interface (e.g., a graphical user interface, etc.) can be used to present the information about the determined risk level during operation 403. Each of the different categories of attributes described above can be weighted in determining the risk level. In one embodiment, there are at least two risk levels that can be determined using the gathered data/attributes, as described above in connection with at least FIG. 1.

Next, at operation 404, a determination is made about the risk level by comparing the risk level with a threshold. In at least one embodiment, a user interface (e.g., a graphical user interface, etc.) can be used to present the information about the determination being during operation 404. If the comparison indicates an acceptable risk level, based on a predetermined relationship with the threshold (e.g., the risk level does not exceed the threshold), then authentication proceeds using the identity data provided during operation 402 (i.e., the initial identity data provided for the current authentication session). If the authentication is successful (operation 405), then the user account corresponding to the device being used for authentication is granted access to the secure network (operation 407). On the other hand, at operation 404, if the comparison indicates an unacceptable risk level based on the predetermined relationship with the threshold (e.g., the risk level exceeds the threshold), then additional identity data must be provided to the device being used for authentication by a user of the device before authentication can commence (operation 406). Any predetermined relationship between the risk level and the threshold may be used for the determination whether the risk level is acceptable. In some embodiments, the threshold is configurable. In one embodiment of operation 406, the additional identity data is combined with the initial identity data provided during operation 402 and used to authenticate the user. If the authentication that is based on the initial identity data and the additional identity data is successful (operation 405), then the user account corresponding to the device being used for authentication is granted access to the secure network (operation 407).

In one embodiment, technique 400 includes operation 408. This operation is performed when authentication is not successful due to the user failing to provide the correct credentials (e.g., the initial identity data, the additional identity data, etc.) being used for authentication. Here, use of an authorization entity can be invoked, as described above in connection with one or more of FIGS. 1-3.

In at least one embodiment, a user interface (e.g., a graphical user interface, etc.) can be used to present the information associated with each of operations 405-408.

For a specific example of operations 404-408, four risk levels are possible. These levels are as follows:

"None"—This risk rating allow access from the device with no challenge (assuming the authentication credentials used during the current session are proper).

"Low"—This risk rating requires at least one challenge to be completed by the user requesting access. Each challenge is randomized from the different authentication factors available (e.g., password, pin, biometrics, secure key, mobile authentication (telephone call), etc.).

"Medium"—This risk rating requires at least one more challenge than the number of challenges used for a "low" risk rating.

"Maximum"—This risk rating requires at least one more challenge than the number of challenges used for a "medium" risk rating. Alternatively, or additionally, this risk rating could trigger use of an authorization entity to determine whether the user is in fact authorized to access the system, and to modify the authorization granted to the user by issuing credentials to the user.

Other risk level definitions and numbers of risk levels may be used as desired.

Figure 5:
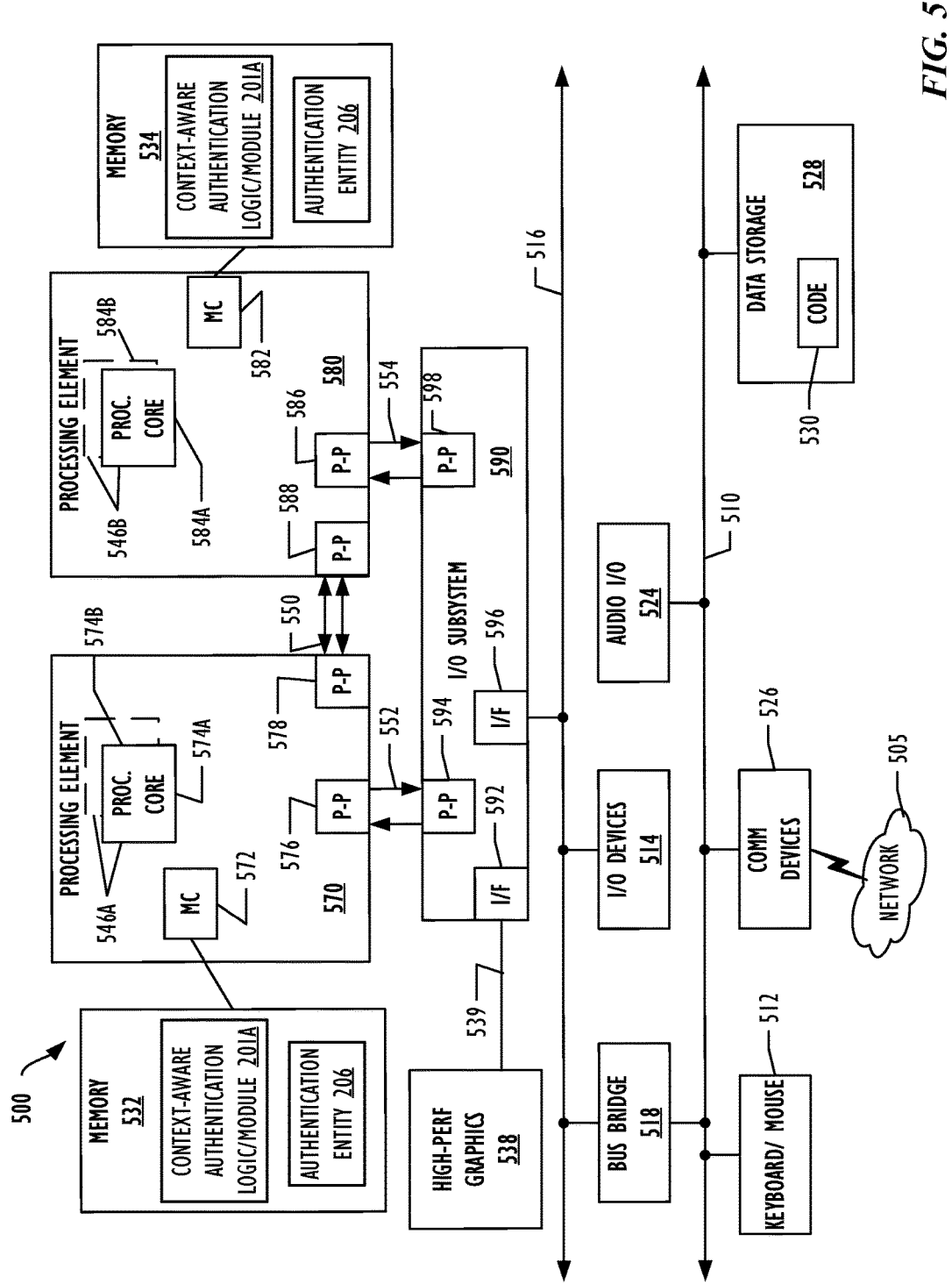
FIG. 5 is a block diagram illustrating a programmable device for use with techniques described herein according to one embodiment.

FIG. 5 is a block diagram that illustrates a programmable device 500, which may be used to implement the techniques described herein in accordance with one or more embodiments (e.g., embodiments described above in connection one or more of FIGS. 1-4). The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574A and 574B and processor cores 584A and 784B). Such cores 574A, 574B, 584A, and 584B may be configured to execute computing instruction code. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546A, 546B may store data (e.g., computing instructions) that are utilized by one or more components of the processing element, such as the cores 574A, 574B and 584A, 584B, respectively. For example, the shared cache may locally cache data stored in a memory 532, 534 for faster access by components of the processing elements 570, 580. For one or more embodiments, the shared cache 546A, 546B may include one or more mid-level caches, such as level 2 (L2), level 3 (L3), level 4 (L4), or other levels of cache, a last level cache (LLC), or combinations thereof. The memory 532, 534 may include software instructions representing one or more the context-aware authentication logic/module 201A and the authentication entity 206. Each of the logic/modules 201A and the entity 206 is described above in connection with at least FIG. 1, 2, 3, or 4.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as a graphics processing unit (GPU), DSP unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 that may couple first link 516 to a second link 520. In one embodiment, second link 520 may be a low pin count (LPC) bus. Various devices may be coupled to second link 720 including, for example, a keyboard/mouse 512, communication device(s) 526 (which may in turn be in communication with the computer network 503), and a data storage unit 528 such as a disk drive or other mass storage device which may include code 530 in one embodiment. The code 730 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. In addition, the elements of FIG. 5 may alternatively be partitioned using more or fewer integrated chips than illustrated in FIG. 5.

Figure 6:
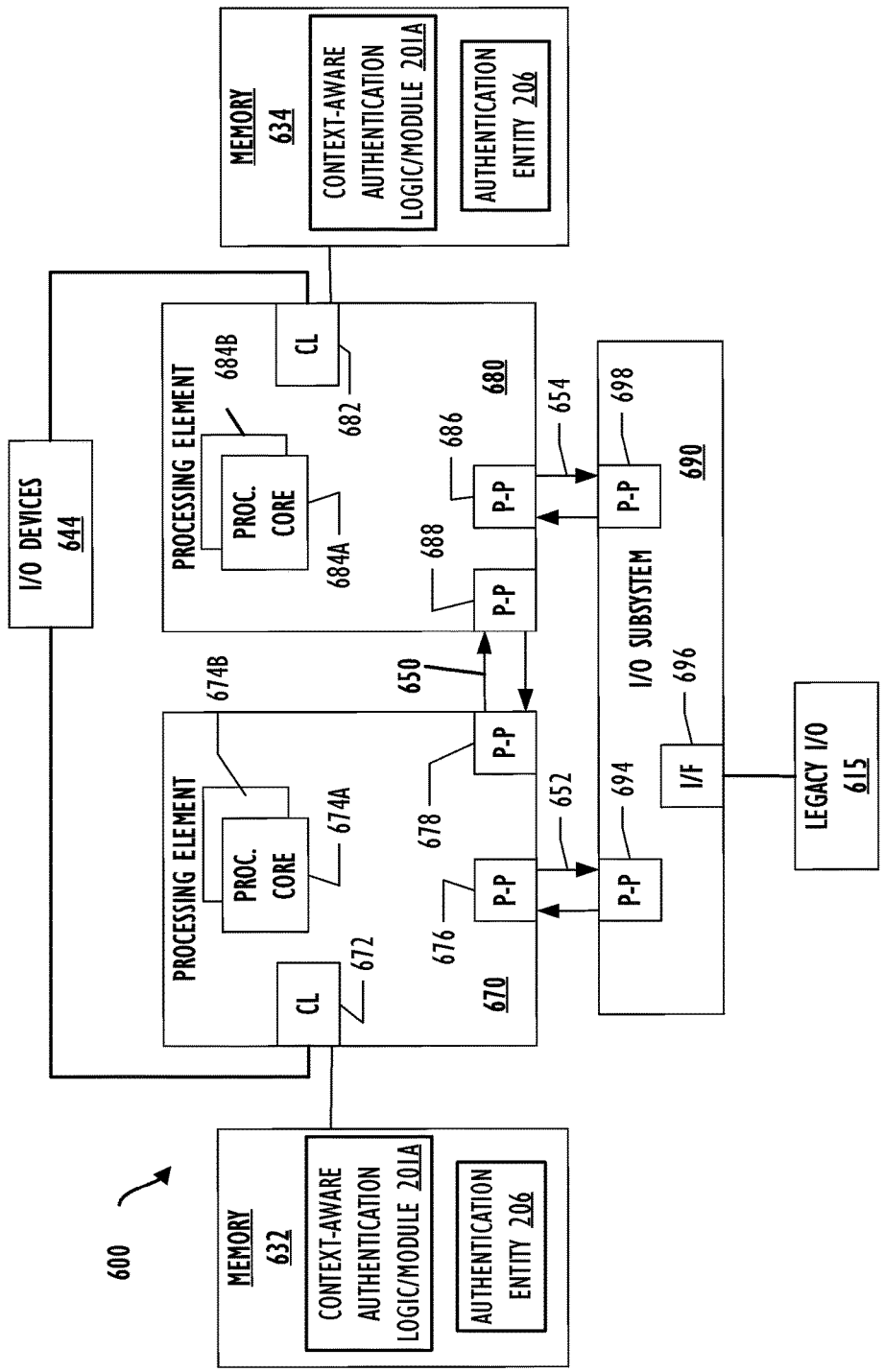
FIG. 6 is a block diagram illustrating a programmable device for use with techniques described herein according to another embodiment.

FIG. 6 is a block diagram illustrating a programmable device 600 for use with techniques described herein according to another embodiment. Certain aspects of FIG. 6 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 6. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively. The memory 632, 634 may include software instructions representing one or more the context-aware authentication logic/module 201A and the authentication entity 206. Each of the logic/modules 201A and the entity 206 is described above in connection with at least FIG. 1, 2, 3, or 4.

The programmable devices depicted in FIGS. 5 and 6 are schematic illustrations of embodiments of programmable devices that may be utilized to implement various embodiments discussed herein. Various components of the programmable devices depicted in FIGS. 5 and 6 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

The following examples pertain to further embodiments.

Example 1 is a machine readable medium storing instructions for context-based authentication in a secure network comprised of multiple interconnected programmable devices, comprising instructions when executed by a machine cause the machine to: receive, from a programmable device, identity data and contextual data associated with a current authentication of a user attempting to access a secure network, the user being associated with the programmable device; determine, based on the identity data and the contextual data, one or more patterns associated with the current authentication of the user; determine, based on the identity data, the contextual data, and the one or more patterns, a risk level associated with the current authentication of the user; and access the secure network in response to the determined risk level.

In Example 2, the subject matter of example 1 can optionally include that the instructions for causing the machine to access the secure network comprise instructions for causing the machine to access the secure network based only on the current authentication in response to comparing the determined risk level with a threshold.

In Example 3, the subject matter of examples 1 or 2 can optionally include that the instructions for causing the machine to access the secure network comprise instructions for causing the machine to request additional identity data in response to determining that the determined risk level does not have a predetermined relationship with a threshold; and access the secure network based on the current authentication and the additional identity data.

In Example 4, the subject matter of example 3 can optionally include that the requested additional identity data is randomized.

In Example 5, the subject matter of examples 1, 2, 3, or 4 can optionally further comprise instructions that when executed by the machine cause the machine to: determine that the authentication is unsuccessful; and invoke an authorization entity in response to the failed authentication.

In Example 6, the subject matter of examples 1, 2, 3, 4, or 5 can optionally include that one or more of the identity data, the contextual data, and the one or more patterns is communicated via an enterprise service bus (ESB).

In Example 7, the subject matter of example 6 can optionally include that the ESB includes a data exchange layer.

In Example 8, the subject matter of examples 6 or 7 can optionally include that the ESB utilizes message queuing telemetry transport messages for data exchange.

Example 9 is a method of context-based authentication in a secure network comprised of multiple interconnected programmable devices, the method comprising: receiving, from a programmable device, identity data and contextual data associated with a current authentication of a user attempting to access a secure network, the user being associated with the programmable device; determining, based on the identity data and the contextual data, one or more patterns associated with the current authentication of the user; determining, based on the identity data, the contextual data, and the one or more patterns, a risk level associated with the current authentication of the user; and accessing the secure network in response to the determined risk level, wherein the accessing is performed by one or more processors.

In Example 10, the subject matter of example 9 can optionally include that accessing the secure network comprises: accessing the secure network based only on the current authentication in response to comparing the determined risk level with a threshold.

In Example 11, the subject matter of examples 9 or 10 can optionally include that accessing the secure network comprises: requesting additional identity data in response to determining that the determined risk level does not have a predetermined relationship with a threshold; and accessing the secure network based on the current authentication and the additional identity data.

In Example 12, the subject matter of example 11 can optionally include that the requested additional identity data is randomized.

In Example 13, the subject matter of examples 9, 10, 11, or 12 can optionally further comprise: determining that the current authentication is unsuccessful; and invoking an authorization entity in response to the unsuccessful current authentication.

In Example 14, the subject matter of examples 9, 10, 11, 12, or 13 can optionally include that one or more of the identity data, the contextual data, and the one or more patterns is communicated via an enterprise service bus (ESB).

In Example 15, the subject matter of example 14 can optionally include that the ESB includes a data exchange layer.

In Example 16, the subject matter of examples 14 or 15 can optionally include that the ESB utilizes message queuing telemetry transport messages for data exchange.

Example 17 is a system for context-based authentication in a secure network comprised of multiple interconnected programmable devices, the system comprising: one or more processors; and a memory coupled to the one or more processors and storing instructions, wherein execution of the instruction by the one or more processors causes the one or more processors to: receive, from a programmable device of the multiple interconnected programmable devices, identity data and contextual data associated with a current authentication of a user attempting to access a secure network, the user being associated with the programmable device; determine, based on the identity data and the contextual data, one or more patterns associated with the current authentication of the user; determine, based on the identity data, the contextual data, and the one or more patterns, a risk level associated with the current authentication of the user; and access the secure network in response to the determined risk level.

In Example 18, the subject matter of example 17 can optionally include that the instructions for causing the one or more processors to access the secure network comprise instructions for causing the one or more processors to: access the secure network based only on the current authentication in response to comparing the determined risk level with threshold.

In Example 19, the subject matter of examples 17 or 18 can optionally include that the instructions for causing the one or more processors to access the secure network comprise instructions for causing the one or more processors to: request additional identity data in response to determining that the determined risk level does not have a predetermined relationship with a threshold; and access the secure network based on the current authentication and the additional identity data.

In Example 20, the subject matter of example 19 can optionally include that the requested additional identity data is randomized.

In Example 21, the subject matter of examples 17, 18, 19, or 20 can optionally further comprise instructions that when executed cause the one or more processors to: determine that the authentication is unsuccessful; and invoke an authorization entity in response to the failed authentication.

In Example 22, the subject matter of examples 17, 18, 19, 20, or 21 can optionally include that one or more of the identity data, the contextual data, and the one or more patterns are communicated via an enterprise service bus (ESB).

In Example 23, the subject matter of example 22 can optionally include that the ESB includes a data exchange layer.

In Example 24, the subject matter of examples 22 or 23 can optionally include that the ESB utilizes message queuing telemetry transport messages for data exchange.

In Example 25, the subject matter of examples 17, 18, 19, 20, 21, 22, 23, or 24 can optionally include that at least one of the one or more processors is a cryptoprocessor.

In Example 26, the subject matter of examples 1, 2, 3, 4, 5, 6, 7, or 8 can optionally include that one or more processors of the machine or the programmable device is a cryptoprocessor.

In Example 27, the subject matter of examples 9, 10, 11, 12, 13, 14, 15, or 16 can optionally include that at least one of the one or more processors is a cryptoprocessor.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A machine readable storage device or storage disk comprising instructions that, when executed, cause a machine to at least:
   obtain, from a programmable device, identity data and contextual data associated with a current authentication attempt by a user attempting to access a secure network, the contextual data indicating a number of authentication factors implementable by the programmable device in connection with the current authentication attempt;
   determine, based on the identity data and the contextual data, a pattern associated with authentication of the user;
   determine, based on the identity data, the number of authentication factors indicated by the contextual data, and the pattern, a risk level associated with the current authentication attempt;
   request additional identity data in response to the risk level not satisfying a threshold;
   determine whether to permit access to the secure network based on the current authentication attempt and the additional identity data; and
   invoke an authorization entity in response to determining not to permit access to the secure network based on the current authentication attempt and the additional data.

2. The machine readable storage device or storage disk of claim 1, wherein the instructions, when executed, further cause the machine to access the secure network in response to the risk level satisfying the threshold.

3. The machine readable storage device or storage disk of claim 1, wherein the instructions, when executed, further cause the machine to determine whether the programmable device is an approved device for the secure network.

4. The machine readable storage device or storage disk of claim 1, wherein the instructions, when executed, further cause the machine to determine whether the programmable device is attempting to access the secure network via a physical communication mechanism.

5. The machine readable storage device or storage disk of claim 1, wherein one or more of the identity data, the contextual data, and the pattern is communicated via an enterprise service bus (ESB).

6. The machine readable storage device or storage disk of claim 5, wherein the ESB includes a data exchange layer.

7. The machine readable storage device or storage disk of claim 5, wherein the ESB is to utilize message queuing telemetry transport messages.

8. A system for context-based authentication, the system comprising:
   one or more processors; and
   memory including instructions that, when executed, cause the one or more processors to:
     access identity data and contextual data associated with a current authentication attempt by a user attempting to access a secure network with a user device, the contextual data indicating a number of authentication factors implementable by the user device in connection with the current authentication attempt;
     determine, based on the identity data and the contextual data, a pattern associated with authentication of the user;
     determine, based on the identity data, the number of authentication factors indicated by the contextual data, and the pattern, a risk level associated with the current authentication attempt;
     request additional identity data in response to the risk level not satisfying a threshold;
     determine whether to permit access to the secure network based on the current authentication attempt and the additional identity data; and
     invoke an authorization entity in response to determining not to permit access to the secure network based on the current authentication attempt and the additional data.

9. The system of claim 8, wherein the one or more processors are to permit access to the secure network in response the risk level satisfying the threshold.

10. The system of claim 8, wherein the one or more processors are to determine whether the user device is an approved device for the secure network.

11. The system of claim 8, wherein the one or more processors are to determine whether the attempted access is via a physical communication mechanism.

12. The system of claim 8, wherein the one or more processors are to communicate one or more of the identity data, the contextual data, and the pattern via an enterprise service bus (ESB).

13. The system of claim 12, wherein the ESB includes a data exchange layer.

14. The system of claim 12, wherein the ESB is to utilize message queuing telemetry transport messages.

15. A method for context-based authentication in a secure network, the method comprising:
   obtaining, from a user device, identity data and contextual data associated with a current authentication attempt by a user attempting to access the secure network, the contextual data indicating a number of authentication factors implementable by the user device in connection with the current authentication attempt;
   determining, based on the identity data and the contextual data, a pattern associated with authentication of the user;
   determining, based on the identity data, the number of authentication factors indicated by the contextual data, and the pattern, a risk level associated with the current authentication attempt;
   requesting additional identity data in response to one or more processors determining the risk level does not satisfy a threshold;
   determining whether to permit access to the secure network based on the current authentication attempt and the additional identity data;
   invoking an authorization entity in response to determining not to permit access to the secure network based on the current authentication attempt and the additional data.

16. The method of claim 15, further including permitting access to the secure network in response to the one or more processors determining the risk level satisfies the threshold.

17. The method of claim 15, wherein the contextual data further indicates whether the user device is an approved device for the secure network, and whether the user device is attempting to access the secure network via a physical communication mechanism.

* * * * *